United States Patent [19]
Cretin et al.

[11] Patent Number: 5,200,927
[45] Date of Patent: Apr. 6, 1993

[54] METHOD AND APPARATUS FOR CONTROLLING AN IMMERSED MULTISOURCE ARRAY EMITTING ACOUSTIC IMPULSES

[75] Inventors: Jacques Cretin, Le Chesnay; Jean-Francois Therond, Neuilly S/Seine; Alain Regnault, Antony, all of France

[73] Assignees: Institut Francais Du Petrole, Rueil Malmaison; Compagnie Generale De Geophysique, Massy, both of France

[21] Appl. No.: 723,385

[22] Filed: Jun. 28, 1991

[30] Foreign Application Priority Data

Jun. 29, 1990 [FR] France .................... 90 08268

[51] Int. Cl.$^5$ ............................................ H04B 17/00
[52] U.S. Cl. ........................................................ 367/13
[58] Field of Search ........................... 367/13, 106, 20; 73/1 DV

[56] References Cited

U.S. PATENT DOCUMENTS

| | | | |
|---|---|---|---|
| 4,599,712 | 7/1986 | Chelminski | 367/144 |
| 4,693,336 | 9/1987 | Newman | 367/15 |
| 4,718,045 | 1/1988 | Desler | 367/24 |
| 4,739,858 | 4/1988 | Dragoset, Jr. | 367/24 |
| 4,757,482 | 7/1988 | Fiske, Jr. | 367/144 |

Primary Examiner—Daniel T. Pihulic
Attorney, Agent, or Firm—Antonelli, Terry, Stout & Kraus

[57] ABSTRACT

In a multisource array of seismic sources, each source is associated with one or more sensors (Ci) for picking up the impulses (TB or signature) emitted by the associated source when triggered. The apparatus essentially includes one or more acquisition arrays (Ai), each one associated with a storage unit (Mi) for all the signals emitted by the pickups (Ci) under the control of a computer (10). Each memory unit includes a comparison module (19, 21, 22) for comparing the digitized samples with a threshold value. The number of each one of the channels where a threshold overrun has occurred is recorded in a reference register (24) which is systematically read by the computer. This monitoring of the level of the picked up signals is carried out outside the normal period where the sources are triggered.

5 Claims, 3 Drawing Sheets

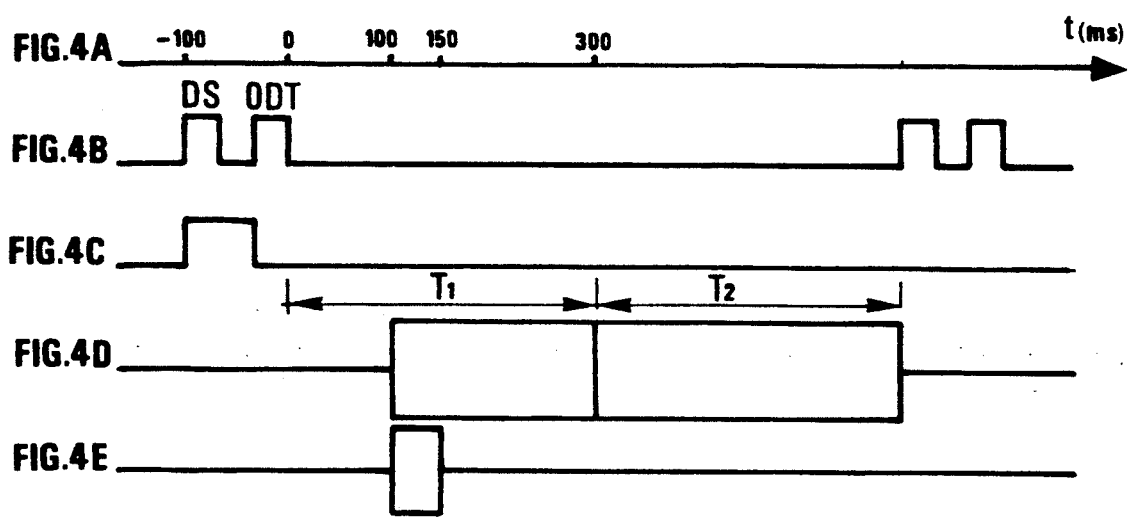
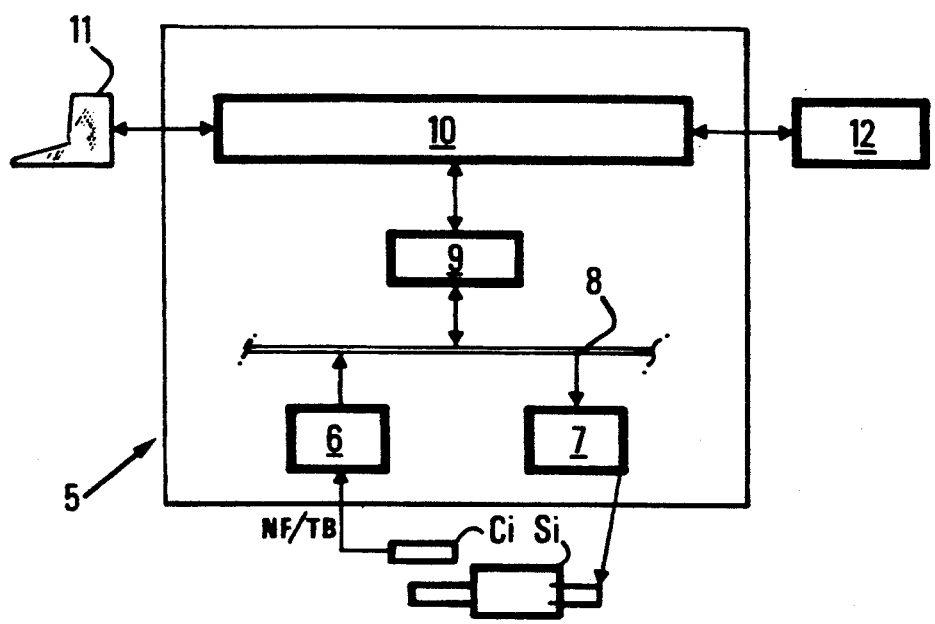

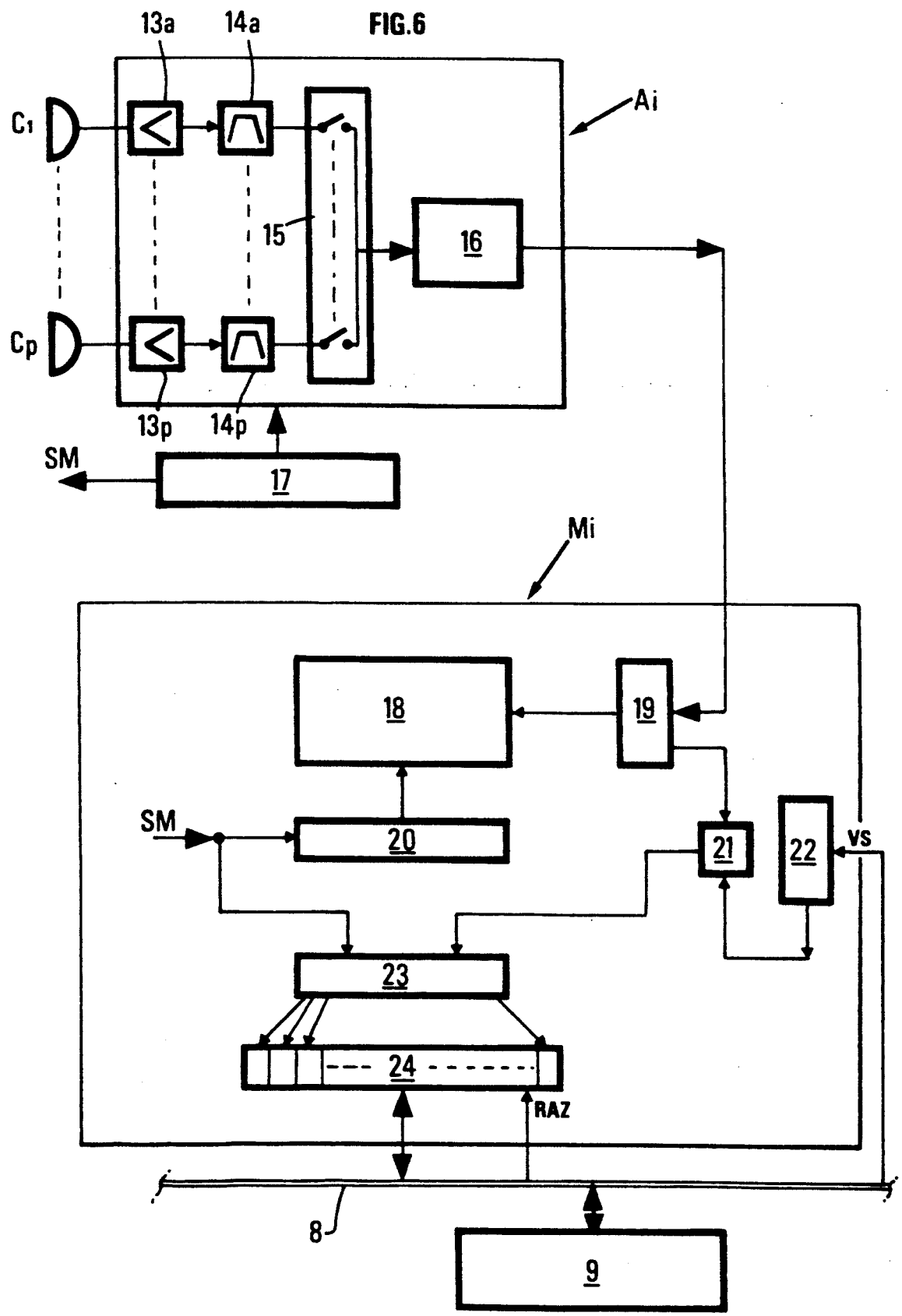

METHOD AND APPARATUS FOR CONTROLLING AN IMMERSED MULTISOURCE ARRAY EMITTING ACOUSTIC IMPULSES

BACKGROUND OF THE INVENTION

The object of the invention is to provide a method and an apparatus for controlling a multisource array emitting acoustic or seismic impulses, which makes it possible to detect possible uncontrolled triggerings.

Marine seismic prospecting methods are usually carried out by using a wave emission array and a wave reception array towed by a ship along a seismic profiling plane to be studied. The waves generated by the emission array are reflected by different reflectors of the immersed formations and are received by the reception array which generally consists of a seismic streamer of great length along which a large number of sensors are arranged.

The emission array often consists of a plurality of impulse sources towed while immersed and connected with the ship by groups of multifunction cables or umbilicals. The form of the wave produced by these impulse sources depends on the type of the sources. If the sources are of the explosion type, such as airguns for example, the main peak is produced first. With sources of the implosion type such as waterguns, the main peak is preceded by a precursory peak with a lower amplitude. Shooting detectors are integrated into the sources or arranged close to them in order to determine the triggering instants and/or the form of the produced impulses.

These sources are immersed, as the case may be, at substantially equal depths or systematically at different depths. The triggering instants are selected with precision in view of the particular layout of the emission array in the water in order to obtain a powerful and directional source. It is a matter of obtaining, by selecting the triggering instants of the different sources, the phasing of their respective main peaks in a certain direction. The operation is generally complex because multiple parameters have to be taken into account. According to its type, its depth of immersion and its mechanical state after a more or less long use, the effective instant when the main peak of the source occurs may vary within notable proportions.

A shooting synchronizer or sequencer adapted for taking into account the different parameters characterizing the emission array used is utilized to control the emission sequences of an array of immersed seismic sources.

Systems where sequencers are used for controlling impulse sources are described, for example, in U.S. Pat. Nos. 4,599,712, 4,693,336, 4,718,045, 4,739,858, and 4,757,482 and in European Patent Applications Nos. 31,196 and 48,623.

Marine seismic prospecting cycles are sometimes disrupted because some sources release themselves at an untimely moment, for various reasons generally due to leaks in the hydraulic control circuits. It may be a simple triggering delay in relation to the planned instant of a shooting sequence, or it may be new spontaneous triggering during the same seismic emission-reception cycle. In both cases, the resulting impulse produced by the emission array is disrupted, and the seismic recordings obtained are distorted.

It is therefore useful that the operator be able to supervise the running of the emission array provided that this supervision does not make the control management allotted to the shooting synchronizer used excessively complicated.

SUMMARY OF THE INVENTION

The method and the apparatus according to the invention make it possible to take into account the tasks of checking a seismic emission array and to integrate it simply into the operations achieved by a shooting synchronizer, notably that which is described in co-pending French Patent Application No. FR 90/08,267.

The method applies to the control of an emission array comprising a plurality of acoustic impulse sources associated with acoustic wave detectors arranged close to the sources piloted by a device controlling the shooting sequences including a programmable computer. The method comprises the acquisition of signals picked up by said acoustic wave detectors during a first time interval containing the planned triggering instants of the different sources and at a first sampling frequency.

The method comprises:

acquiring the signals picked up by the same detectors during a second time interval after the first one and at a second sampling frequency lower than the first frequency;

detecting the signals picked up during the second time interval by each one of the detectors, whose level exceeds a set threshold value, and the storage of the possible overruns in an overrun indicator;

reading systematically the overrun indicator by the computer; and checking the signals which have caused an overrun of the set threshold value.

The shooting check apparatus according to the invention makes it possible to check the triggering of the sources of an immersed emission array consisting of a plurality of acoustic impulse sources associated with acoustic wave detectors arranged close to said sources. The apparatus comprises an acquisition device connected to the different detectors for sampling and digitizing the signals produced by the detector when said sources are triggered, a shooting control apparatus for controlling the triggering of the sources, and a programmable computer communicating with the acquisition apparatus and with the shooting control apparatus, the computer being adapted for piloting the acquisition apparatus during a first time interval at a first sampling frequency.

The apparatus comprises a detection assembly communicating with the computer and consisting of:

a comparison means for comparing each sample of all the signals received by the different detectors with a threshold signal imposed by the computer during a second time interval; and a storage means for keeping the threshold overrun indications detected by the comparison means for each source and until the end of each emission-reception cycle, the computer being adapted for reading the storage means to identify the detectors which have picked up signals exceeding the threshold value and, when requested by the operator, for reproducing each signal that has exceeded the threshold value.

According to one embodiment, the total detectors are, for example, divided into groups of p detectors, the acquisition apparatus comprises for each group of p detectors means for multiplexing the signals coming from the different detectors and means for digitizing the multiplexed signals, at least one storage unit for said digitized signals associated with a register for the digitized data to be successively stored and an address register, and the detection array comprises a comparator producing a binary comparison signal, a switching means controlled by the address register to direct each binary comparison signal selectively towards the binary elements of a register with n bits, and the computer is adapted for sequentially reading the content of the binary elements of the register with p bits to detect those corresponding to overruns of said threshold value.

Each detection array comprises, for example, a register connected with the computer to store a threshold value, this register being connected with said comparator.

BRIEF DESCRIPTION OF THE DRAWINGS

Other features and advantages of the method and the device according to the invention will be clear from reading the description hereafter of an embodiment given by way of non-limitative example, with reference to the accompanying drawings in which:

FIGS. 4A to 4E show waveforms of an example of an emission-reception cycle;

FIG. 5 shows the block diagram of a synchronizer controlling the progress of the shooting sequences; and FIG. 6 shows the block diagram of an acquisition and storage array making it possible to supervise the sources.

DESCRIPTION OF THE PREFERRED EMBODIMENTS

Figure 1:
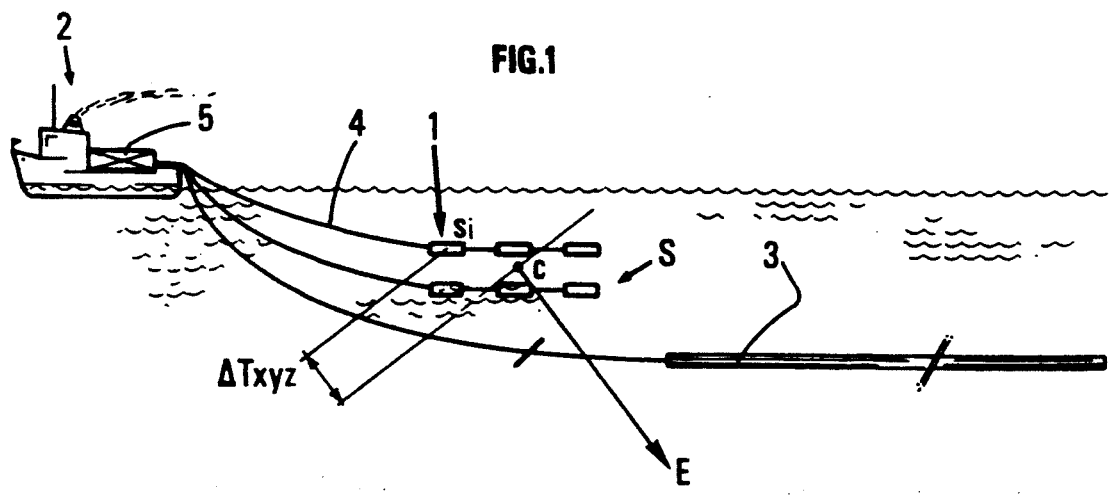
FIG. 1 diagrammatically shows a marine seismic emission-reception array.

A marine seismic emission-reception system, such as that schematized in FIG. 1, comprises an acoustic impulse emission array 1 towed in immersion by a ship 2, as well as a reception array consisting of a seismic streamer 3 of great length. Emission array 1 generally comprises several sources divided among several sub-arrays, each one consisting of several sources located along a harness of multifunction cables or umbilicals 4. The sub-arrays are towed at the same depth with different lateral offsets in relation to the trajectory of the ship and/or, as the case may be, at different depths.

Each source receives a triggering signal from a control system 5 through transmission lines in the umbilical 4 that connects the source with the ship. In return, control system 5 receives, from a kinematic sensor integrated in each source, a triggering signal TB defining the exact triggering instant. An acoustic sensor located in close proximity to each source (one meter for example) or, as the case may be, to each group of sources when several of them are grouped together, produces a proximity signal NF that is usually called "signature" SGN, which is also transmitted to the control system 5. The same sensor is also used between the shootings to measure the depth of immersion of each source. The signals TB are a few milliseconds earlier than the corresponding signals SGN.

Figure 2:
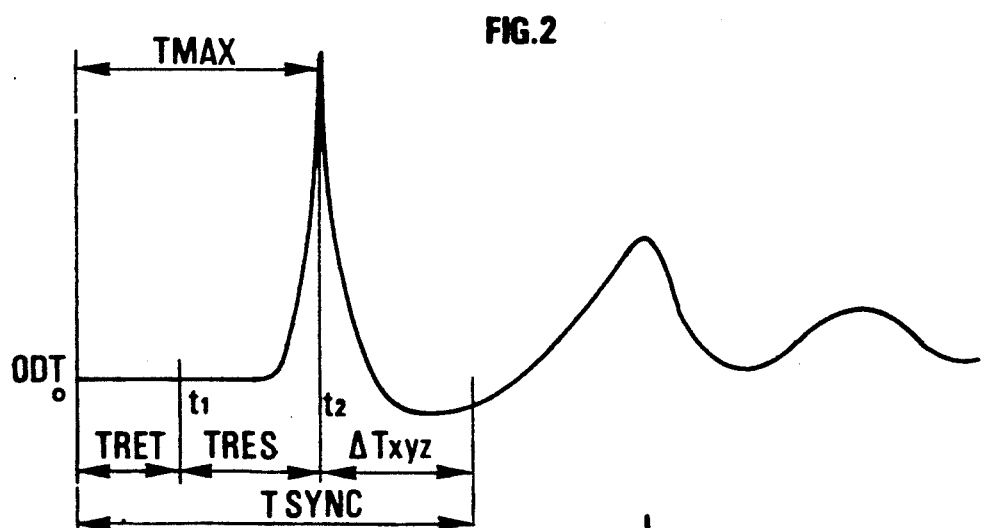
FIG. 2 shows the approximate form of an impulse emitted by a source such as an airgun.
Figure 3:
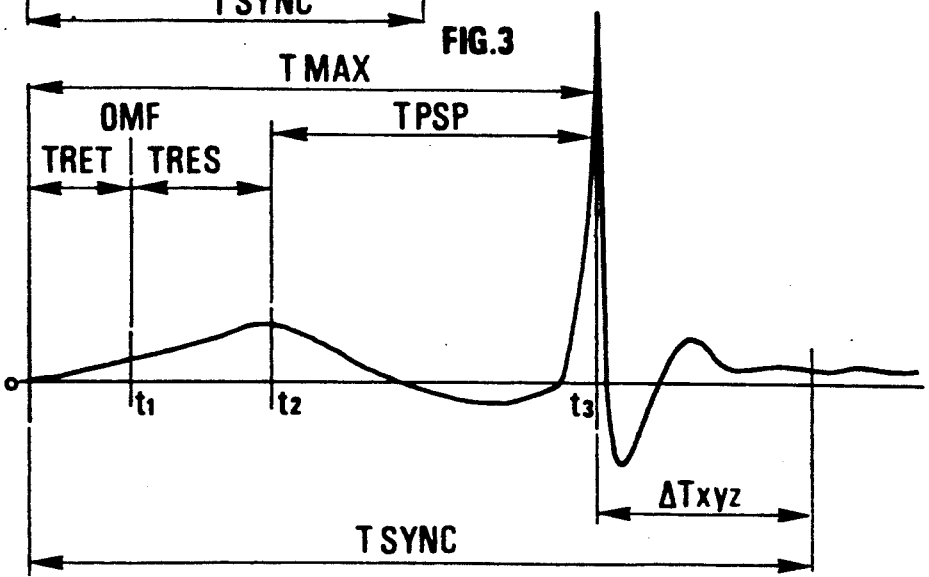
FIG. 3 shows the approximate form of a corresponding impulse emitted by a watergun.

An initial instant ODT defines the beginning of each "shooting" sequence (FIGS. 2, 3). Each source is effectively triggered by control system 5 with a delay TRET in order to obtain a phasing of the different impulses produced. Each source reacts to the triggering signal with a delay time TRES depending on its mechanical and/or hydraulic structure.

After its triggering ordered with the time from the delay time interval TRET (instant t1), an explosive source (FIG. 2) produces its main peak (instant t2) which is followed by a secondary peak with a lower amplitude (instant t3).

The main peak of a source of the implosion type (FIG. 3) is preceded at the instant t2 by a precursory peak. The gap (t3−t2) is the pseudo-period TPSP which varies according to the well-known Raleigh's relationship.

The control system 5 comprises (FIG. 5) an acquisition and storage apparatus 6 receiving the signals TB and/or SGN supplied by the sensors associated with all the sources C of the emission array. It also comprises a shooting control apparatus 7 for adapting the triggering signals transmitted to the solenoid valves of the different sources. The acquisition and storage device 6, as well as control apparatus 7, communicate through an address and data bus 8 with an interface card 9 which is connected with a programmable computer 10. Interacting between the operators and computer 10 is achieved by means of a control desk 11 and a display screen 12.

This use of a specialized apparatus makes it possible to obtain a higher acquisition, digitizing and storage speed than if computer 10 were entrusted with these tasks.

Acquisition apparatus 6 (FIG. 6) comprises several acquisition cards Ai, each one having a set number p of channels making possible the acquisition of the signals TB or SGN picked up by p detection sensors (p=32 for example). Each channel comprises a preamplifier $13a$ .. . $13p$ in series with a bandpass filter $14a$ ... $14p$. The gain and features of each filter are adapted to the type of sensors C1 ... Cp that are used. The filtered signals are applied to a multiplexer 15 with p inputs whose output is connected with a digitizing circuit 16. The signals digitized by each acquisition card A1 ... An are respectively stored in memory cards. The computer can read them by means of interface card 9. The acquisition cards are controlled by means of a synchronization card 17 connected with bus 8 which synchronizes through signals SA and SM the multiplexing, the digitizing and the storage of the digitized data. The acquisition time and the sampling frequency may be different, depending on whether the sensors connected with the inputs of each acquisition card are signals TB or SGN.

Each memory unit Mi comprises a memory module 18 associated with a data register 19 which is connected to the output of the analog to digital converter 16, and to an address register 20 controlled by the synchronization signal SM. The inputs of a digital comparator 21 are respectively connected to data register 19 and to a register 22 which is linked with bus 8. The computer loads into register 22 a digital word representing a threshold value VS. When each digital word passing through data register 19 is larger than the threshold value VS, comparator 21 emits an overrun bit. This bit is applied at the input of an electronic switch 23 with p outputs which are respectively connected to the inputs in parallel of a register 24 with p bits also. Switch 23 is also controlled by the synchronization signal SM. The reset input RAZ is connected to bus 8. Register 24 is reset at the end of each reading cycle. With this layout, sensors C1 to Cp being interrogated in sequence, the different bits of register 24 are respectively associated with the different acquisition channels (13, 14). If on any channel an acquired sample exceeds the threshold value stored in register 22, a logical 1 is loaded into the corresponding binary element of register 24. Computer 10 may, therefore, read at any time the different bits of the binary word in register 24 in order to test them and to know whether a threshold overrun has been noticed during an emission-reception cycle.

Each working cycle of the check device comprises the piloting of an emission sequence through the total sources of the emission array, a real time acquisition stage directly managed by the acquisition apparatus and a measuring and checking stage where the computer, from the digitized data stored during the previous stage, authenticates the received signals TB or SGN, by comparison with reference data, calculates their reception time and updates the reference data by including authenticated data, as described in the above cited copending French Patent Application No. FR 90/08,267.

Each emission-reception cycle begins at an initial instant marked by an impulse DS which is controlled by the operator or which occurs automatically at defined intervals (FIG. 4B). The impulse DS has the effect of initializing all the counters and registers of the device. From the instant defined by DS, the computer orders the acquisition of the signals SGN indicative of the depths of immersion of the different sources (FIG. 4C) and, in the case where the sources are of the implosion type, it calculates their respective pseudo-periods in order to determine the instants where they will have to be triggered to obtain the phasing of their main peaks in a chosen particular direction.

The reference instant common to all the elements of the device is defined by an impulse ODT (FIG. 4B). The acquisition of the signals TB and/or SGN picked up by the detectors begins from this instant. Their storage is triggered after 10 ms for example (FIG. 4D) at the same time as the sequence of triggering of the different sources begins (FIG. 4E).

The acquisition and storage stage is divided into two parts. In a first part of duration T1 (FIG. 4D), the signals TB and SGN are sampled and stored at a frequency f1 of 10 kHz for example (signal SM in FIG. 6). This main signal acquisition interval T1 is followed by a supervision time interval T2 which goes on until the following initialization impulse DS is emitted. During this second interval, the device continues to sample and store the signals TB and SGN at a lower frequency f2, of 3 kHz for example. No signal TB or SGN should normally be detected outside period T1. Any signal detected during this interval T2 corresponds therefore to a spontaneous triggering of the sources or it is a parasitic signal.

As described in the above cited French Patent Application No. FR 90/08,267, the computer 10 achieves different operations of authentication of the picked up signals TB and SGN and of calculation of the respective triggering times of the sources.

With the layout described in FIG. 6, the computer can also, at any time, test the different bits of the state register 24. If, during the period T2 of the cycle, signals due to self-triggering of the sources or to interference have been picked up, register 24 indicates the channel(s) concerned. The operator can then, by means of his desk 11 (FIG. 5), control the display of each one of the abnormal signals. A visual examination will tell him if it is a spontaneous triggering.

We claim:

1. A method for checking the triggering of an immersed emission array including a plurality of acoustic impulse sources, a plurality of acoustic wave detectors arranged close to said sources, and a device for monitoring the triggering sequences of the sources including a programmable computer, wherein the acquisition of signals by said acoustic wave detectors is effected during a first time interval containing the expected triggering times of the acoustic impulse sources, said method comprising:

acquiring the signals by said acoustic wave detectors during a second time interval subsequent to the first time interval;

detecting the ones of the signals acquired during the second time interval whose levels exceed a set threshold value as possible overruns;

storing the possible overruns in an overrun indicator;

reading systematically the overrun indicator; and checking the signals which have caused the overruns.

2. A shooting check apparatus for checking the triggering of the sources of an immersed emission array including a plurality of acoustic impulse sources, a plurality of acoustic wave detectors arranged close to said sources, an acquisition apparatus connected to the detectors to sample and digitize the signals produced by the detectors when the sources are triggered, a shooting control apparatus for controlling the triggering of the sources, and a programmable computer communicating with the acquisition apparatus and the shooting control apparatus, the computer being adapted for controlling the acquisition apparatus during a first time interval at a first sampling frequency the shooting check apparatus comprising:

a detecting assembly communicating with said computer and including:

a) comparison means for comparing each sample of signals received by the detectors with a threshold value from the computer during a second time interval and generating a threshold overrun indication when a received sample exceeds the threshold value; and b) storage means for storing threshold overrun indications from the comparison means for each source during each emission-reception cycle, the computer being adapted for reading the storage means to identify detectors that have picked up signals exceeding the threshold value and being responsive to a request by an operator for reproducing each signal exceeding the threshold value.

3. A device as claimed in claim 2 wherein the detecting assembly comprises a plurality of groups of p detector means; the acquisition apparatus comprises for each group of p detector means multiplexing means for multiplexing signals coming from the detector means, digitizing means for digitizing the multiplexed signals, register means, at least one memory unit for storing digitized signals associated with the register means, an address register, a comparator for producing a binary comparison signal, a p-bit register, switching means controlled simultaneously with the address register for directing each binary comparison signal selectively towards the binary elements of the p-bit register, said computer being adapted for reading sequentially the contents of the p-bit register to detect those elements storing bits indicative of overruns of said threshold value.

4. An apparatus as claimed in claim 3, wherein each detecting assembly further includes a threshold register connected to the computer and to the comparator for storing a threshold value.

5. An apparatus as claimed in any one of claims 2 to 4, wherein the acquisition apparatus comprises at least one acquisition array including a plurality of amplification and filtering units, storage means, multiplexing means connecting the amplification and filtering units to the storage means, and an address and data bus for permitting the acquisition apparatus and the shooting control apparatus to communicate with the computer.

* * * * *